Jan. 23, 1951 A. A. LIMBERG 2,538,839
REAR WHEELHOUSING CONSTRUCTION
FOR AUTOMOBILE BODIES
Filed Jan. 20, 1947 3 Sheets-Sheet 1
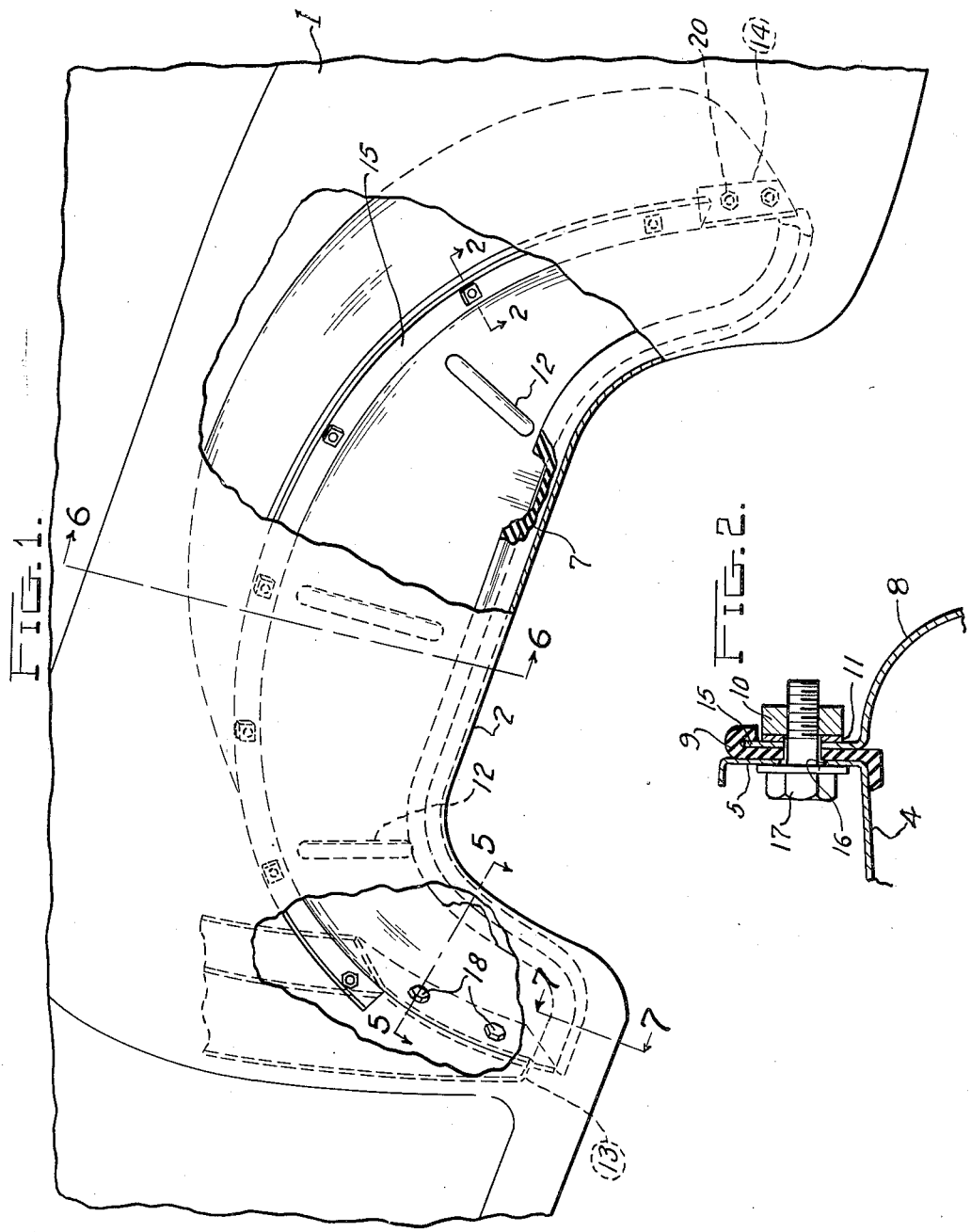
INVENTOR.
Alfons A. Limberg
BY
Barnes, Kisselle, Laughlin & Raisch
ATTORNEYS

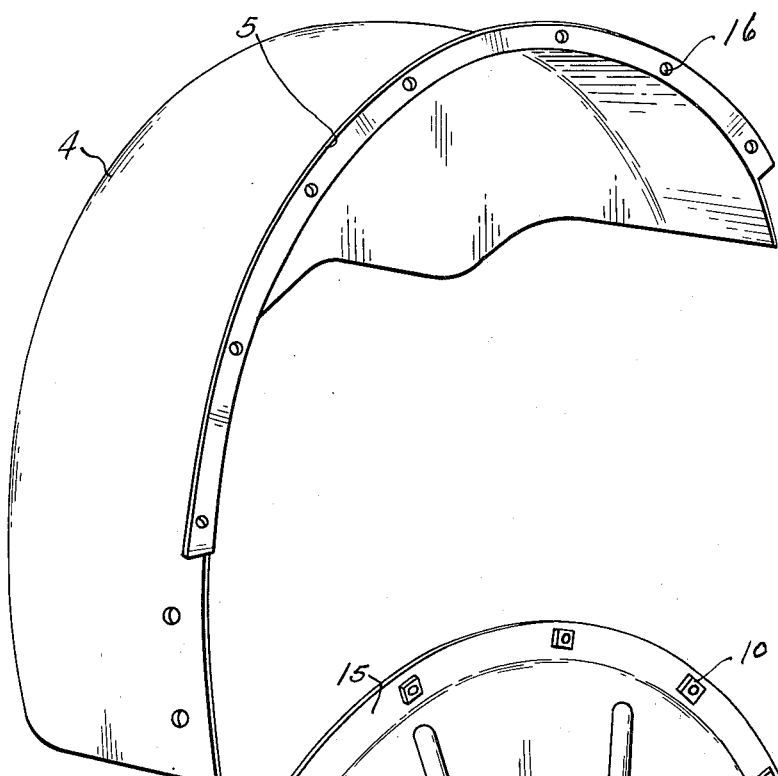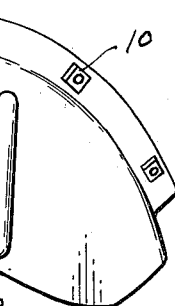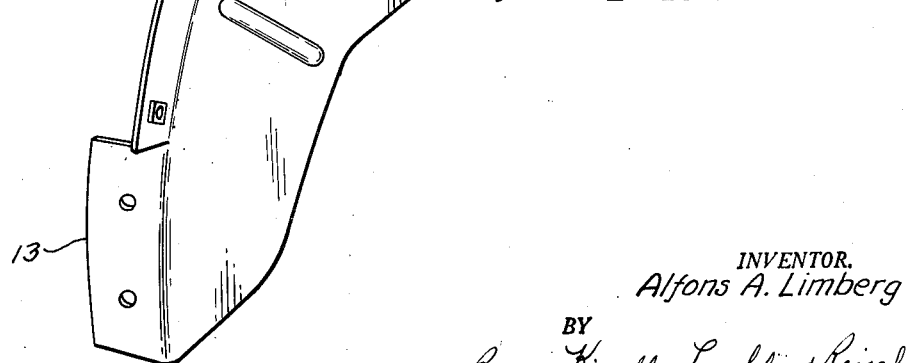

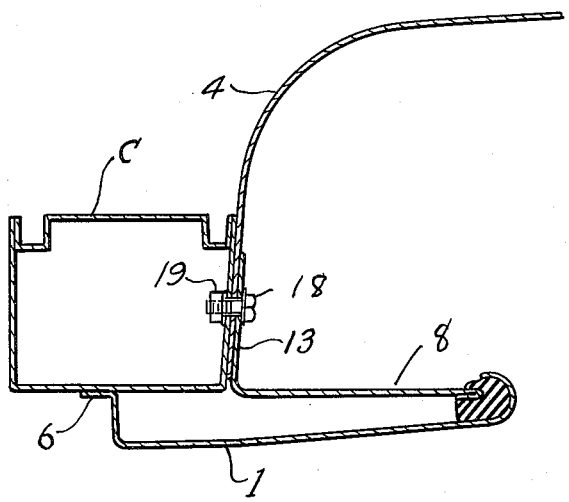
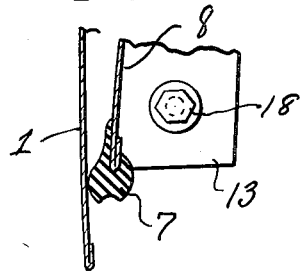
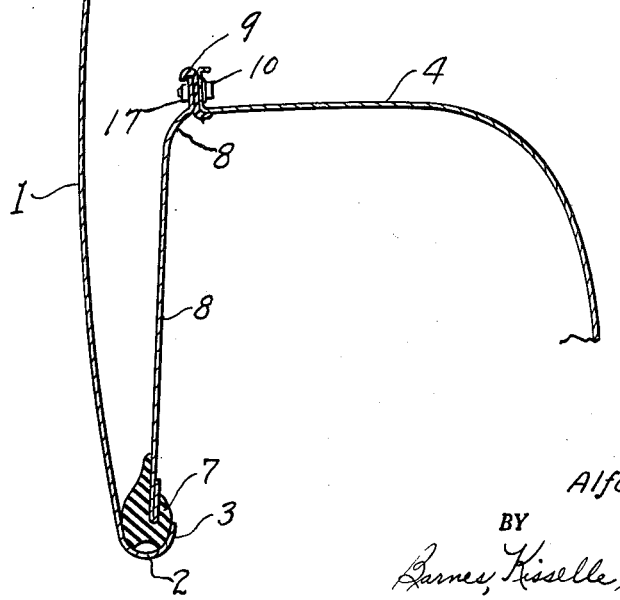

Patented Jan. 23, 1951

2,538,839

UNITED STATES PATENT OFFICE 2,538,839

REAR WHEEL HOUSING CONSTRUCTION FOR AUTOMOBILE BODIES

Alfons A. Limberg, Grosse Pointe, Mich., assignor to General Motors Corporation, Detroit, Mich., a corporation of Delaware Application January 20, 1947, Serial No. 723,155

1 Claim. (Cl. 296—28)

This invention relates to automobile body construction, particularly the rear wheelhousing.

It is the object of the present invention to afford a better joint between the wheelhousing and the rear quarter panel and at the same time provide a wheelhousing panel which can be removably installed. This permits the wheelhousing panel to be painted or rust-proofed and installed after the body has been assembled and painted. This is particularly useful as it permits the wheelhousing panel to be painted or rust-proofed on both sides. It is also very useful in replacing a worn or damaged wheelhousing panel, the rear quarter panel or fender for repairs. The better joint referred to above is a rubber-sealed joint both at the top and bottom of the removable wheelhousing panel. This avoids seepage of water and moisture onto the inside of the body where it may corrode some of the inside steel surfaces that are not painted or rust-proofed.

Referring to the drawings:

Fig. 1 is a perspective of the lower rear side portion of a body.

Fig. 2 is a section on the line 2—2 of Fig. 1.

Fig. 3 is a perspective of the wheelhousing inner panel.

Fig. 4 is a perspective of the wheelhousing outer panel.

Figs. 5, 6 and 7 are sections on the corresponding section lines of Fig. 1.

I designates the rear quarter panel of an automobile body. This rear quarter panel is designed to take the place of the usual rear fender. It is bulged at the lower end to give, in a measure, the fender effect. The bulge is shown particularly in Fig. 6. The lower end of the rear quarter panel is recessed at 2 to provide clearance for the insertion or withdrawal of the wheel. This recess, of course, can be covered up by a removable fender skirt panel if this is desired. Or a hinge panel can be applied to conceal this recess. The lower edge is turned up to form a bead 3. The wheelhousing inner panel 4 is fastened in the usual way (by welding) to the floor pan (not shown). This establishes it in fixed relation with the rear quarter panel in the usual way. It is substantially standard construction except that it has a turned-up flange 5. The inner panel 4 abuts against the rear side of the rear body post C. The rear quarter panel I is flanged at 6 and spot welded to the outer face of the rear body pillar, as shown in Fig. 5.

A rubber sealing strip 7 straddles the bottom of the wheelhousing outer panel 8 and is fastened thereto by cement. A rubber sealing strip 9 is cemented to the top of the wheelhousing outer panel 8. The anchor nuts 10 are secured to the flange of the wheelhousing inner panel by means of nut cages 11 which are spot welded to the flange of the inner panel. The details of these nut cages are not shown as they are well known in the art. The outer panel is corrugated as at 12 for reinforcement and is provided at the front end with a turned-in flange 13, and at the rear with a turned-in flange 14.

The turned-up flange 15 of the outer panel is adapted to match the flange 5 turned up on the wheelhousing inner panel 4. The flange 15 is provided with enlarged bolt holes 16 which take the bolts 17 that screw into the anchor nuts 10. These enlarged openings permit the inner panel to adjust itself properly in position where the flanges meet after the outer panel 8 has been nested or rested with its sealing strip 7 in the bead, as shown in Fig. 6. The bolts may then be turned into the anchor nuts on the back of the flange 15. The bolts 18 may be passed through the openings in the front flange 13 and through the forward portion of the wheelhousing inner flange 4 and into the anchor nuts 19 in the rear body pillar. Similarly, bolts and nuts 20 on the rear flange 14 serve to tie the wheelhousing outer panel to the rear end of the wheelhousing inner panel. It will be noted, at the bottom of the wheelhousing outer and inner panels the sealing strip 7 simply lies against and abuts the inside of the rear quarter panel (compare Figs. 1 and 7).

From the above description it will be seen that the joint between the outer and inner wheelhousing panels is sealed water tight both at top and bottom. It will also be apparent that the wheelhousing outer panel can be easily removed and easily replaced by simply unscrewing the bolts that engage in the anchor nuts in the outer panel flange and also in the body pillar. It is, therefore, not only easy to service a portion of the wheelhousing by replacing this part, but it is also apparent that the wheelhousing outer panel may be painted or rust-proofed separately from other parts of the body and inserted in place after the floor pan and wheelhousing inner panel have been assembled to the outer shell, and particularly the rear quarter panel is readily accessible for painting or repairing. The wheelhousing outer panel can be easily put in place by nesting the rubber-covered lower edge into the turned-over bead and then bolting the parts together, as already described.

What I claim is:

In a sheet metal body, body structure including a wheelhousing inner panel, a body panel having a fixed relation with the wheelhousing inner panel and forming the outer cover for the wheel, and a wheelhousing outer panel removably secured between the said body panel and the wheelhousing inner panel, the said body panel having its lower edge turned under and up to form an upwardly opening channel, the said wheelhousing panels having turned-up abutting flanges along their upper edges, and rubber sealing strips secured to the lower edge of the wheelhousing outer panel and one of the flanges at the top of said panels, the wheelhousing outer panel with its rubber-covered edge being insertable and nesting in the channelled edge of the said body panel and the flanges and the sealing strips of the two wheelhousing panels being boltable together.

ALFONS A. LIMBERG.

REFERENCES CITED

The following references are of record in the file of this patent:

UNITED STATES PATENTS

| Number | Name | Date |
|---|---|---|
| 2,025,065 | Menton | Dec. 24, 1935 |
| 2,073,058 | Greene | Mar. 9, 1937 |
| 2,114,830 | Carr | Apr. 19, 1938 |
| 2,140,476 | Ledwinka | Dec. 13, 1938 |
| 2,349,940 | Craig | May 30, 1944 |
| 2,417,324 | Rivard et al. | Mar. 11, 1947 |

FOREIGN PATENTS

| Number | Country | Date |
|---|---|---|
| 505,160 | Great Britain | May 5, 1939 |